United States Patent [19]

Baehr et al.

[11] Patent Number: 4,880,566

[45] Date of Patent: Nov. 14, 1989

[54] SILICATE-AND MAGNESIUM-FREE STABILIZER MIXTURES

[75] Inventors: Bernd D. Baehr, Neuss; Ulrich Rall, Langenfeld; Hildegard van Delden, Hilden; Wolfgang Lillotte, Monchen-Gladbach, all of Fed. Rep. of Germany

[73] Assignee: Henkel Kommanditgesellschaft auf Aktien, Duesseldorf, Fed. Rep. of Germany

[21] Appl. No.: 290,881

[22] Filed: Dec. 22, 1988

Related U.S. Application Data

[63] Continuation of Ser. No. 945,921, Dec. 23, 1986, abandoned.

[30] Foreign Application Priority Data

Dec. 23, 1985 [DE] Fed. Rep. of Germany ....... 3545909

[51] Int. Cl.$^4$ ..................... C09K 15/32; C09K 3/100; C23F 11/00; C01B 15/01
[52] U.S. Cl. .......................... 252/389.22; 252/400.22; 252/186.41; 252/186.29
[58] Field of Search ....................... 252/186.28, 186.29, 252/186.41, 389.22, 400.22

[56] References Cited

U.S. PATENT DOCUMENTS

| | | | |
|---|---|---|---|
| 3,860,391 | 1/1975 | Kling et al. | 8/111 |
| 3,959,168 | 5/1976 | Germscheid et al. | 252/389.22 X |
| 3,996,151 | 12/1976 | Kirner | 252/186 |
| 4,138,353 | 2/1979 | Lipinski | 252/389.22 X |
| 4,163,733 | 8/1979 | Buckman et al. | 252/389.22 X |
| 4,246,030 | 1/1981 | Lipinski | 252/384.22 X |
| 4,363,699 | 12/1982 | DeCeuster et al. | 162/71 |
| 4,497,725 | 2/1985 | Smith et al. | 252/186.28 X |
| 4,510,068 | 4/1985 | Rohlfs et al. | 252/400.22 X |
| 4,614,646 | 9/1986 | Christiansen | 423/272 |

FOREIGN PATENT DOCUMENTS 0076166 6/1983 European Pat. Off. .
3423452 2/1986 Fed. Rep. of Germany .

*Primary Examiner*—John F. Terapane
*Assistant Examiner*—Valerie D. Fee
*Attorney, Agent, or Firm*—Ernest G. Szoke; Wayne C. Jaeschke; Real J. Grandmaison

[57] ABSTRACT

Silicate- and magnesium-free stabilizer mixtures for stabilizing aqueous peroxide bleaching baths based on organic acids and/or salts thereof comprising:
  (A) polyhydroxy and/or hydroxycarboxylic acids, and their alkali metal and/or ammonium salts;
  (B) polyacrylic acids, and their partially neutralized form; and
  (C) polyamine and/or amine polyphosphonic acids, and their alkali metal and/or ammonium salts;
  (D) 35% hydrogen peroxide solution with the proviso that the ratio by weight of components A:B:C is 1 to 6:0.2 to 1:0.4 to 4.

7 Claims, No Drawings

SILICATE- AND MAGNESIUM-FREE STABILIZER MIXTURES

This application is a continuation of application Ser. No. 06/945,921, filed 12/23/86. Abandonment 12/22/88.

BACKGROUND OF THE INVENTION

1. Field of the Invention

This invention relates to silicate- and magnesium-free stabilizer mixtures for stabilizing aqueous peroxide bleaching baths, and to a process for bleaching cellulose fibers, if desired in combination with synthetic fibers, with aqueous hydrogen peroxide solutions stabilized with silicate- and magnesium-free stabilizer mixtures.

Cellulose fibers and mixtures consisting of cellulose and synthetic fibers are frequently bleached with hydrogen peroxide in alkaline medium. However, alkaline peroxide baths are not stable. The rate at which they decompose increases with increasing temperature, so that stabilizers have to be added to enable the peroxide to be utilized with virtually no losses for the bleaching process. Stabilizers based on waterglass, i.e. silicate, in combination with magnesium ions are normally used for caustic-alkaline peroxide bleaching.

Waterglass-containing stabilizers have an outstanding anticatalytic effect against heavy metals, such as iron, copper, nickel, manganese and compounds thereof. Heavy metals and their compounds are able to enter and contaminate the bleaching bath through the water, the chemicals, the apparatus or even the material being bleached and to cause catalytic decomposition of the peroxide which in turn results in fiber damage. Further advantages of stabilizer mixtures containing waterglass include outstanding bleaching effects and the absence of husks in the cellulose fiber components. However, a serious disadvantage of silicate-containing stabilizers is that calcium and/or magnesium silicates are precipitated where hard water is used, resulting in a hard feel of, and in the formation of marks, on the material and also in difficulties during dyeing and printing. In addition, unwanted silicate deposits can build up in machine units. In the bleaching of starch-sized material, which has not been enzymatically desized, inadequate, desizing effects are obtained despite the use of sodium persulfate.

2. Discussion of the Related Art

The result of these disadvantages of silicate-containing stabilizers is that many purely organic silicate-free stabilizers have been developed. Thus, U.S. Pat. No. 3,860,391, for example, describes organic stabilizer mixtures consisting of amino-lower alkane phosphonic acids, polyhydroxy or hydroxycarboxylic acids and polyaminocarboxylic acids. By comparison with silicate-containing stabilizers, however, the desired effects in regard to desizing, whiteness and the final average degree of polymerization are still not obtained with silicate-free mixtures. Accordingly, an object of the present invention is to provide silicate- and magnesium-free stabilizer mixtures which do not have any of the described disadvantages of silicate-free stabilizer mixtures in regard to desizing, whiteness and resulting average degree of polymerization.

DESCRIPTION OF THE INVENTION

It has now surprisingly been found that solutions containing hydrogen peroxide which have been stabilized with stabilizer mixtures comprising (A) polyhydroxy- and/or hydroxycarboxylic acids, if desired in the form of their alkali metal and/or ammonium salts, (B) polyacrylic acids, if desired in partially neutralized form, and (C) polyamine- and/or amine polyphosphonic acids, if desired in the form of their alkali metal and/or ammonium salts, the ratio by weight of components A:B:C being 1 to 6:0.2 to 1:0.4 to 4, show distinctly better effects in regard to desizing, whiteness and final average degree of polymerization than known silicate-free stabilizer mixtures and comparable effects in relation to silicate containing stabilizers.

Other than in the operating examples, or where otherwise indicated, all numbers expressing quantities of ingredients or reaction conditions used herein are to be understood as modified in all instances by the term "about".

Accordingly, the present invention relates to silicate-free and magnesium-free stabilizer mixtures for stabilizing aqueous peroxide bleaching baths based on organic acids and/or salts thereof, characterized in that they comprise as essential components (A) polyhydroxy- and/or hydroxycarboxylic acids, if desired in the form of their alkali metal and/or ammonium salts, (B) polyacrylic acids, if desired in partially neutralized form, and (C) polyamine- and/or amine polyphosphonic acids, if desired in the form of their alkali metal and/or ammonium salts, with the proviso that the ratio by weight of components A:B:C is 1 to 6:0.2 to 1:0.4 to 4. The stabilizer mixtures according to the invention are preferably homogeneous aqueous solutions and preferably contain from 5 to 30% by weight of component (A), from 1 to 5% by weight of component (B) and from 2 to 20% by weight of component (C). Particular preference is attributed to silicate- and magnesium-free stabilizer mixtures in the form of homogeneous aqueous solutions containing from 10 to 25% by weight of component (A), from 2 to 3% by weight of component (B) and from 3.5 to 17% by weight of component (C).

Polyhydroxy and/or hydroxycarboxylic acids containing from 1 to 6 carbon atoms in the carbon chain are preferably used, if desired in the form of their alkali metal and/or ammonium salts. Gluconic acid, sodium gluconate, tartaric acid and/or citric acid are particularly preferred. Particularly suitable polyamine and/or amine polyphosphonic acids, if desired in the form of their alkali metal and/or ammonium salts, are diethylenetriamine penta-(methylenephosphonic acid) (DTPMP), ethylenediamine tetra-(methylenephosphonic acid) (EDTMP), hexamethylenediamine tetra-(methylenephosphonic acid) and/or aminotri-(methylenephosphonic acid). The polyacrylic acids present in the stabilizer mixtures according to the invention preferably have gram molecular weights of from about 1,000 to about 15,000. Polyacrylic acids having gram molecular weights of from about 3,000 to about 8,000 are particularly suitable.

The present invention also relates to a process for bleaching cellulose fibers, if desired in combination with synthetic fibers, with aqueous stabilized hydrogen peroxide solutions, characterized in that aqueous alkaline hydrogen peroxide solutions are stabilized with silicate- and magnesium-free stabilizer mixtures comprising (A) polyhydroxy and/or hydroxycarboxylic acids, if desired in the form of their alkali metal and/or ammonium salts, (B) polyacrylic acids, if desired in partially neutralized form, and (C) polyamine- and/or amine polyphosphonic acids, if desired in the form of their alkali metal and/or ammonium salts, the ratio by weight of components A:B:C being 1 to 6:0.2 to 1:0.4 to 4. The mixtures according to the invention contain the preferred compounds and are used in the quantities mentioned above. Based on the quantities of aqueous 35% by weight hydrogen peroxide solution used, the stabilizer mixtures according to the invention are used in concentrations of from about 2 to about 25% active substance. The pH-value of the stabilized aqueous hydrogen peroxide solutions is preferably from about 9 to about 13. The bleaching of cellulose fibers, such as cotton, linen, nettle and jute, and also of mixtures consisting of cellulose fibers and synthetic fibers, particularly polyester fibers, may be carried out both in long baths, for example in winch vats, or in short baths, as in impregnation processes. The latter processes may be carried out on the one hand as so-called cold bleaching, for which purpose the bleaching liquor remains in the material being bleached for a longer period, while on the other hand the bleaching material impregnated with bleaching liquor may be heated to temperatures above 100° C. in an I-box or the like, thus enabling the bleaching time to be shortened. The bleaching process is preferably carried out at temperatures of from about 15° C. to about 145° C.

In order to accelerate the wetting of the materials to be bleached, wetting agents may be added to the bleaching liquor. Suitable wetting agents are any of the usual substances which are effective in alkaline media and which are compatible with the constituents of the stabilizer mixtures according to the invention, such as anionic and/or nonionic wetting agents. Fatty acid sulfonates, alkylaryl sulfonates and/or protein cleavage products for example have been successfully used as anionic wetting agents. Suitable nonionic wetting agents are adducts of alkylene oxide, particularly ethylene oxide, with for example fatty acids, fatty acid amides, fatty alcohols and/or alkylphenols.

Aqueous hydrogen peroxide solutions are preferably used as bleaching agents.

In the examples, the following tests were used to determine whiteness, desizing, absorbency and final average degree of polymerization:

1. Whiteness measurement—determined as % remission using a Zeiss Elrepho with an R 46 filter.
2. Degree of desizing—on the TEGEWA violet scale. This scale extends from 1 to 9; 9 stands for complete removal of size, adequate desizing being obtained beyond 6.
3. Absorbency test modified in accordance with DIN 53924—measured on 20 mm wide strips of cloth in the wrap direction after 15, 30 and 60 seconds.
4. Average degree of polymerization (AP)—by the EWNN-method; DIN 54270—T 3-77.

EXAMPLE I

A raw material of 100% cotton was impregnated with bleaching liquor composition in a laboratory padding machine (Mathis) providing a squeezing effect of 87%. The material was bundled up and stored for 16 hours at room temperature.

An impregnating liquor of the following composition was used for comparison.

(a) Conventional bleaching liquor composition (Comparison)
6 g/l wetting agent
12 ml/l waterglass, 38° Be
10 g NaOH, 100%
2 ml/l complexing agent
5 g sodium persulfate
60 ml/l peroxide, 35%

(b) Bleaching liquor composition according to the invention
6 g/l wetting agent
6 ml/l organic stabilizer according to the invention consisting of:
  22.0% by weight sodium gluconate
  3.0% by weight polyacrylic acid, partially neutralized
  3.5% by weight DTPMP
  4.5% by weight NaOH, 50%
  67.0% by weight fully deionized water
12 g/l NaOH, 100%
5 g/l sodium persulfate
60 ml/l peroxide, 35%

Result

| | Whiteness in % remission | TEGEWA mark | Rise height in mm after seconds | | | AP-value |
|---|---|---|---|---|---|---|
| | | | 15 s | 30 s | 60 s | |
| Raw material | 60.2 | 2 | 0 | 0 | 0 | 2670 |
| Formulation (a) | 86.0 | 4 | 15 | 21 | 27 | 2560 |
| Formulation (b) | 87.5 | 6–7 | 14 | 19 | 26 | 2480 |

Whereas formulation (a) produced totally inadequate desizing, formulation (b) produced a degree of desizing which did not present difficulties in any of the following treatment processes. Whiteness was slightly improved, absorbency was virtually the same; there was also no significant differences in regard to the AP-value.

EXAMPLE II

Using a laboratory padding machine (Mathis) and a pilot-scale steamer (Benz), a double cotton cloth was subjected first to cold bleaching and then to peroxide shock bleaching.

Impregnating liquors of the following composition were used for comparison both in the cold bleaching and in the shock bleaching treatment:

(a) Conventional bleaching liquor composition (Comparison)
1. Cold bleaching
0.15 g/l MgSO$_4$.7 H$_2$O
12 ml/l waterglass, 38° Be
12 g/l NaOH, 100%
8 g/l wetting agent
2 ml/l complexing agent
5 g/l sodium persulfate
50 ml/l peroxide, 35%
Liquor uptake: 82%
Residence time: 20 hours at room temperature.
The material was then washed and dried.
2. Peroxide shock bleaching
0.15 g/l MgSO$_4$.7 H$_2$O
12 ml/l waterglass, 38° Be
8 g/l NaOH, 100%
8 g/l wetting agent
2 ml/l complexing agent
15 ml/l peroxide, 35%
Liquor uptake: 84% Reaction time 90 seconds, saturated steam atmosphere 100° C. The material was then washed and dried.

(b) Bleaching liquor composition according to the invention

1. Cold bleaching 12 g/l NaOH, 100%
6 ml/l organic stabilizer according to the invention consisting of:
  17.0% by weight sodium gluconate
  2.0% by weight polyacrylic acid, partially neutralized
  6.0% by weight DTPMP
  4.5% by weight NaOH, 50%
  70.5% by weight fully deionized water
8 g/l wetting agent
5 g/l sodium persulfate
50 ml/l peroxide, 35%
Liquor uptake: 84%
Residence time 20 hours at room temperature.
The material was then washed and dried.

2. Peroxide shock bleaching 8 g/l NaOH, 100%
6 ml/l organic stabilizer according to the invention consisting of:
  17.0% by weight sodium gluconate
  2.0% by weight polyacrylic acid, partially neutralized
  6.0% by weight DTPMP
  4.5% by weight NaOH, 50%
  70.5% by weight fully deionized water
8 g/l wetting agent
10 ml/l peroxide, 35%
Liquor uptake: 84% Reaction time 90 seconds, saturated steam atmosphere 100° C. The material was then washed and dried.

Result

|  | Whiteness in % remission | TEGEWA mark | Rise height in mm after seconds | | | AP-value |
|---|---|---|---|---|---|---|
|  |  |  | 15 s | 30 s | 60 s |  |
| raw material | 58.4 | 1 | 0 | 0 | 0 | 3070 |
| Formulation (a) | 87.8 | 2 | 27 | 35 | 45 | 2800 |
| Formulation (b) | 86.5 | 4–5 | 25 | 32 | 40 | 2680 |

Despite the high whiteness obtained with the bleaching liquor composition according to the invention, the AP was not significantly reduced by comparison with formulation (a). Desizing was distinctly better.

EXAMPLE III

After impregnation with the peroxide bleaching liquor, a knitted fabric (100% cotton interlock) prebleached with hypochlorite was treated for 30 minutes in a saturated steam atmosphere at 100° C. in a pilot-scale steamer (Benz) and then hot- and cold-washed.

An impregnating liquor of the following composition was used for comparison.

(a) Conventional bleaching liquor composition (Comparison)

0.15 g/l MgSO$_4$.7 H$_2$O
12 ml/l waterglass, 38° Be
6 g/l NaOH, 100%
5 g/l wetting agent
2 ml/l complexing agent
15 ml/l peroxide, 35%
Liquor uptake approx. 130%

(b) Bleaching liquor composition according to the invention 3 g/l NaOH, 100%
15 ml/l organic stabilizer according to the invention consisting of:
  12.0% by weight sodium gluconate
  2.6% by weight polyacrylic acid
  17.0% by weight EDTMP
  68.4% by weight fully deionized water
5 g/l wetting agent
15 ml/l peroxide, 35%
Liquor uptake approx. 130%

Result

|  | Whiteness in % remission | Rise height in mm after seconds | | | AP-value |
|---|---|---|---|---|---|
|  |  | 15 s | 30 s | 60 s |  |
| Raw material | 58.4 | 0 | 0 | 0 | 2820 |
| After hypochlorite bleaching | 77.4 | 0 | 0 | 0 | — |
| Peroxide bleaching Formulation (a) | 93.1 | 25 | 33 | 43 | 2470 |
| Peroxide bleaching Formulation (b) | 92.5 | 23 | 29 | 36 | 2370 |

The results show that substantially the same very high degree of whiteness was obtained with the bleaching liquor composition according to the invention for an above-average average degree of polymerization.

EXAMPLE IV

After impregnation with the peroxide bleaching liquor, a desized cotton fabric was treated for 30 minutes in a saturated steam atmosphere at 100° C. in a pilot-scale steamer (Benz) and then hot- and cold-washed.

An impregnating liquor of the following composition was used for comparison.

(a) Conventional waterglass-containing bleaching liquor composition (Comparison)

24 ml/l waterglass, 38° Be
14 ml/l NaOH, 50° Be
4 g/l wetting agent
2.4 ml/l complexing agent
35 ml/l peroxide, 35%
Liquor uptake: 100%

(b) Silicate-free bleaching liquor composition according to German Patent Application 22 11 578

8 ml/l NaOH, 50° Be
4 g/l wetting agent
0.2 g/l DTPMP
4 g/l gluconic acid
0.4 g/l diethylenetriamine pentaacetic acid
35 ml/l peroxide, 35%
Liquor uptake: 100%

(c) Bleaching liquor composition according to the invention 5 ml/l NaOH, 50° Be
4 g/l wetting agent
16 ml/l organic stabilizer according to the invention consisting of:
  15.0% by weight sodium gluconate
  3.0% by weight polyacrylic acid
  15.0% by weight EDTMP
  67.0% by weight fully deionized water
35 ml/l peroxide, 35%
Liquor uptake: 100%
Result

| | Whiteness in % remission | AP- value | Residual peroxide 35% ml/kg fabric |
|---|---|---|---|
| Raw material | 66.1 | 3320 | |
| Formulation (a) | 88.0 | 2570 | 5 |
| Formulation (b) | 85.1 | 2460 | 1 |
| Formulation (c) | 86.9 | 2630 | 2.5 |

The results show that a higher degree of whiteness was obtained with the bleaching liquor composition according to the invention for a higher final average degree of polymerization both by comparison with formulation (b) and by comparison with formulation (a).

We claim:

1. An aqueous bath comprising 35% by weight hydrogen peroxide solution containing a silicate-free and magnesium-free stabilizer mixture therefor, said stabilizer mixture consisting essentially of:
   (A) from about 5 to about 30% by weight of polyhydroxy carboxylic acid and/or hydroxy carboxylic acid, and their alkali metal and/or ammonium salts;
   (B) from about 1 to about 5% by weight of polyacrylic acid, and said acid in partially neutralized form; and
   (C) from about 2 to about 20% by weight of polyamine-polyphosphonic acid and/or amine-polyphosphonic acid, and their alkali metal and/or ammonium salts; with the proviso that the ratio by weight of components A:B:C is 1 to 6:0.2 to 1:0.4 to 4.

2. An aqueous bath as in claim 1 containing from about 10 to about 25% by weight of component (A), from about 2 to about 3% by weight of component (B), and from about 3.5 to about 17% by weight of component (C).

3. An aqueous bath as in claim 1 wherein said component (B) has a gram molecular weight of from about 1,000 to about 15,000.

4. An aqueous bath as in claim 1 wherein said component (B) has a gram molecular weight of from about 3,000 to about 8,000.

5. An aqueous bath as in claim 1 wherein said component (A) contains from about 1 to about 6 carbon atoms in the carbon chain.

6. An aqueous bath as in claim 1 wherein said component (A) is selected from the group consisting of gluconic acid, sodium gluconate, tartaric acid, and citric acid.

7. An aqueous bath as in claim 1 wherein said component (C) is selected from the group consisting of diethylenetriamine penta-(methylenephosphonic acid), ethylenediamine tetra-(methylenephosphonic acid), hexamethylenediamine tetra-(methylenephosphonic acid), and aminotri-(methylenephosphonic acid).

* * * * *